(12) United States Patent
Uchida et al.

(10) Patent No.: US 9,053,554 B2
(45) Date of Patent: Jun. 9, 2015

(54) OBJECT DETECTION DEVICE USING AN IMAGE CAPTURED WITH AN IMAGING UNIT CARRIED ON A MOVABLE BODY

(75) Inventors: Naohide Uchida, Shizuoka-ken (JP); Tatsuya Shiraishi, Susono (JP); Masakazu Nishijima, Susono (JP); Takeshi Nanami, Gotemba (JP); Hiroki Goto, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 663 days.

(21) Appl. No.: 13/259,753

(22) PCT Filed: Apr. 22, 2010

(86) PCT No.: PCT/IB2010/000900
§ 371 (c)(1),
(2), (4) Date: Sep. 23, 2011

(87) PCT Pub. No.: WO2010/122409
PCT Pub. Date: Oct. 28, 2010

(65) Prior Publication Data
US 2012/0027258 A1  Feb. 2, 2012

(30) Foreign Application Priority Data

Apr. 23, 2009  (JP) .................... 2009-105468

(51) Int. Cl.
*G06K 9/00*  (2006.01)
*G06T 7/20*  (2006.01)
(52) U.S. Cl.
CPC ............. *G06T 7/20* (2013.01); *G06K 9/00805* (2013.01); *G06T 2207/10016* (2013.01); *G06T 2207/30261* (2013.01)

(58) Field of Classification Search
CPC ................ G06K 9/00805; G06T 2207/10016; G06T 2207/30261; G06T 7/20
See application file for complete search history.

(56) References Cited

U.S. PATENT DOCUMENTS 6,535,114 B1 *  3/2003  Suzuki et al. ................. 340/435
6,594,583 B2 *  7/2003  Ogura et al. .................. 701/301

(Continued)

FOREIGN PATENT DOCUMENTS

EP     1 909 064 A1    4/2008
JP     2005-157779     6/2005

(Continued)

OTHER PUBLICATIONS

Mallot et al. "Inverse Perspective Mapping Simplifies Optical Flow Computation and Obstacle Detection" Biol. Cybern. 64, pp. 177-185-pp. 1-9 (1991).*

(Continued)

*Primary Examiner* — Chan Park
*Assistant Examiner* — Mia M Thomas
(74) *Attorney, Agent, or Firm* — Finnegan, Henderson, Farabow, Garrett & Dunner, LLP

(57) ABSTRACT

An object detection device including: an imaging unit (11) carried on a movable body; a first calculation unit (21; 22; 23) that calculate an observed value of an image displacement among a plurality of images captured by the imaging unit (11) at respective different timings; a first object detection unit (10, 21; 10, 22; 10, 23) that detects an object candidate and acquires information of the object candidate; a second calculation unit (21, 22, 23) that calculates a theoretic value of the image displacement on the basis of the information of the object candidate; and a second object detection unit (21; 22; 23) that compares the observed value of the image displacement and the theoretic value of the image displacement and determines whether the object candidate is an object on the basis of the comparison result.

7 Claims, 14 Drawing Sheets

(56) References Cited

U.S. PATENT DOCUMENTS

| | | | |
|---|---|---|---|
| 6,963,661 B1* | 11/2005 | Hattori et al. | 382/154 |
| 7,035,430 B2* | 4/2006 | Ito et al. | 382/103 |
| 7,639,841 B2* | 12/2009 | Zhu et al. | 382/104 |
| 7,710,246 B2* | 5/2010 | Arakawa et al. | 340/435 |
| 7,782,179 B2* | 8/2010 | Machii et al. | 340/435 |
| 7,853,072 B2* | 12/2010 | Han et al. | 382/155 |
| 8,041,079 B2* | 10/2011 | Chiu et al. | 382/104 |
| 8,477,194 B2* | 7/2013 | Matsuno | 348/169 |
| 8,527,445 B2* | 9/2013 | Karins et al. | 706/46 |
| 8,565,482 B2* | 10/2013 | Ding et al. | 382/103 |
| 8,605,998 B2* | 12/2013 | Samples et al. | 382/159 |
| 8,744,122 B2* | 6/2014 | Salgian et al. | 382/103 |
| 8,854,458 B2* | 10/2014 | Fukamachi et al. | 348/142 |
| 2002/0071034 A1* | 6/2002 | Ito et al. | 348/152 |
| 2003/0103648 A1* | 6/2003 | Ito et al. | 382/103 |
| 2003/0141762 A1* | 7/2003 | Sartori et al. | 307/10.1 |
| 2004/0022417 A1* | 2/2004 | Nishigaki et al. | 382/104 |
| 2005/0196020 A1* | 9/2005 | Comaniciu et al. | 382/104 |
| 2005/0201593 A1* | 9/2005 | Sawada et al. | 382/104 |
| 2005/0248654 A1* | 11/2005 | Tsujino et al. | 348/169 |
| 2005/0271254 A1* | 12/2005 | Hougen | 382/104 |
| 2006/0013480 A1* | 1/2006 | Sano | 382/103 |
| 2006/0111841 A1* | 5/2006 | Tseng | 701/301 |
| 2007/0206835 A1* | 9/2007 | Abe | 382/104 |
| 2007/0285217 A1* | 12/2007 | Ishikawa et al. | 340/435 |
| 2008/0025568 A1* | 1/2008 | Han et al. | 382/103 |
| 2008/0136612 A1* | 6/2008 | Machii et al. | 340/435 |
| 2008/0147488 A1* | 6/2008 | Tunick et al. | 705/10 |
| 2008/0243390 A1* | 10/2008 | Nakamori | 701/301 |
| 2009/0190800 A1* | 7/2009 | Takahashi | 382/104 |
| 2010/0052972 A1* | 3/2010 | Kasano et al. | 342/28 |
| 2010/0073480 A1* | 3/2010 | Hoek et al. | 348/148 |
| 2010/0094520 A1* | 4/2010 | Zagorski | 701/70 |
| 2010/0328070 A1* | 12/2010 | Murray | 340/568.1 |
| 2011/0249153 A1* | 10/2011 | Hirooka et al. | 348/241 |
| 2012/0019655 A1* | 1/2012 | Fukamachi et al. | 348/142 |
| 2014/0003671 A1* | 1/2014 | Matsubara | 382/104 |

FOREIGN PATENT DOCUMENTS

| | | |
|---|---|---|
| JP | 2008-140155 | 6/2008 |
| JP | 2008-187580 | 8/2008 |
| JP | 2008-282106 | 11/2008 |
| WO | WO 03/001472 A1 | 1/2003 |

OTHER PUBLICATIONS

W. Enkelmann, "Obstacle Detection by Evaluation of Optical Flow Fields from Image Sequences," Image and Vision Computing, vol. 9, No. 3, pp. 160-168 (Jun. 1991).

International Search Report in International Application No. PCT/IB2010/000900; Mailing Date: Jul. 22, 2010.

Written Opinion of the International Searching Authority in International Application No. PCT/IB2010/000900; Mailing Date: Jul. 22, 2010.

* cited by examiner

F I G . 12
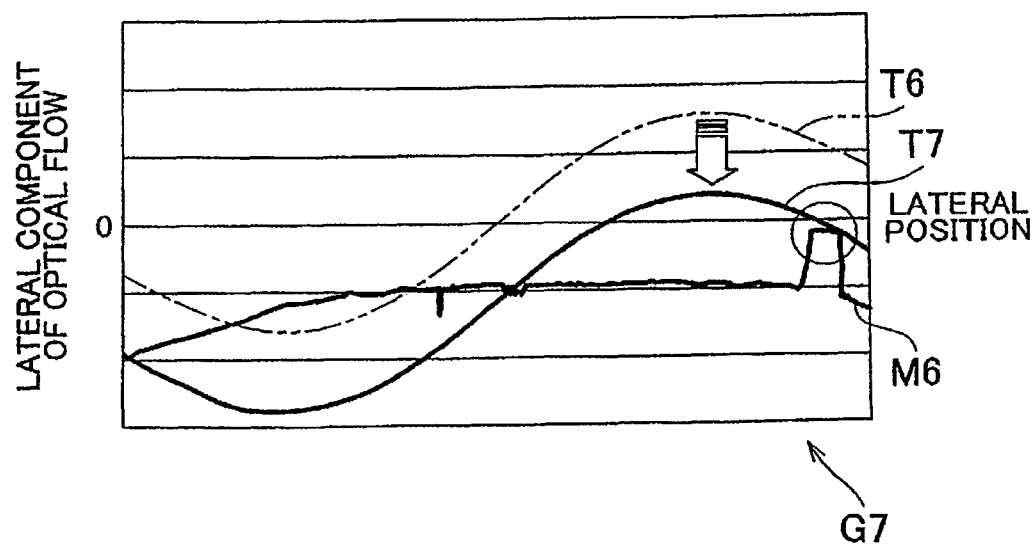

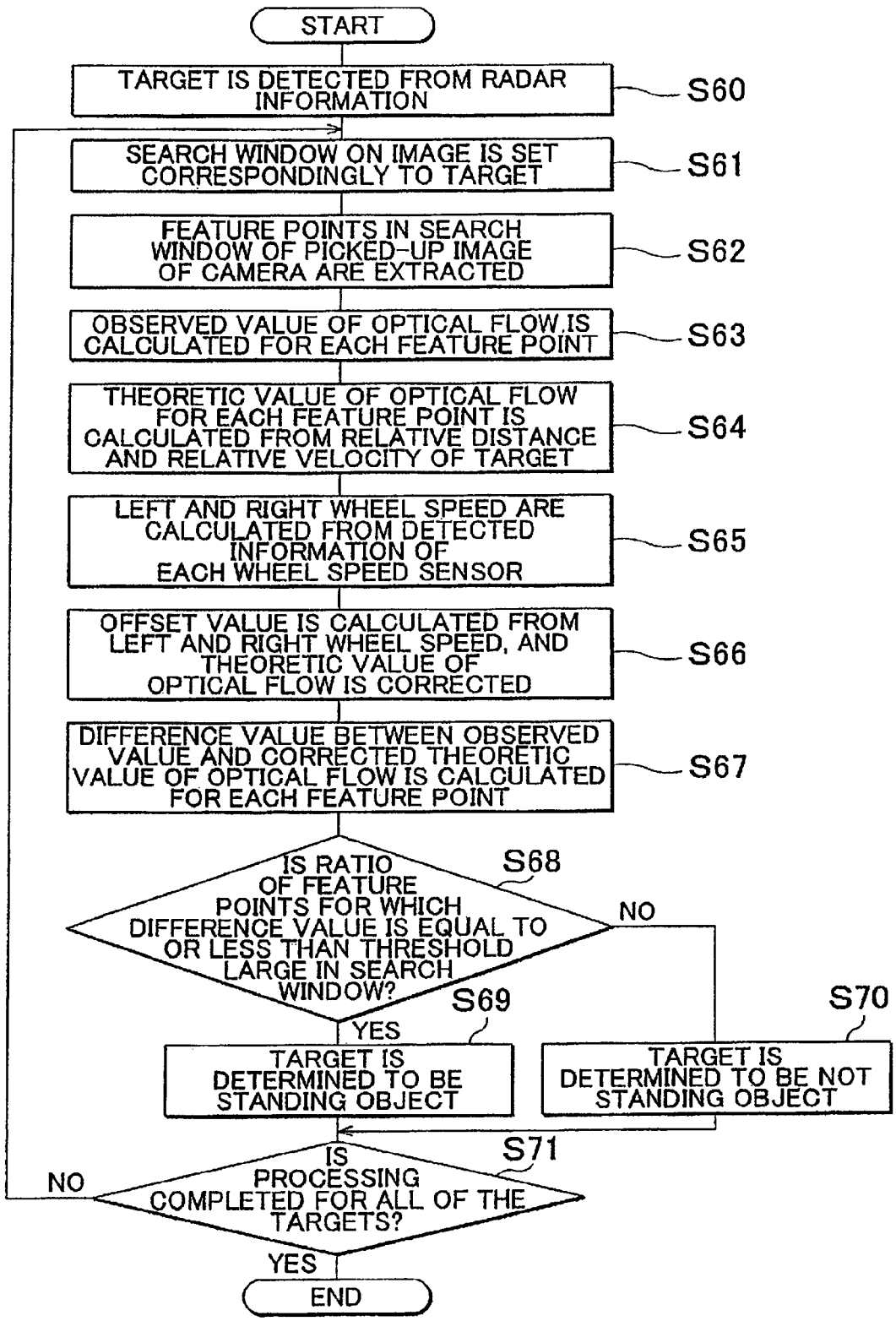

OBJECT DETECTION DEVICE USING AN IMAGE CAPTURED WITH AN IMAGING UNIT CARRIED ON A MOVABLE BODY

CROSS-REFERENCE TO RELATED APPLICATIONS

This application is a national phase application of International Application No. PCT/IB2010/000900, filed Apr. 22, 2010, and claims the priority of Japanese Application No. 2009-105468, filed Apr. 23, 2009, the contents of both of which are incorporated herein by reference.

BACKGROUND OF THE INVENTION

1. Field of the Invention

The invention relates to an object detection device that detects an object by using an image captured with an imaging unit carried on a movable body.

2. Description of the Related Art

A method using optical flow is available as a technique for detecting an object by using an image captured by a camera carried on a movable body such as a vehicle. The optical flow is a velocity field in each point (pixel, region, feature point) in an image from a series of images that are continuous in time and represents the motion of an object in the image by a vector. A technique for detecting the motion of another vehicle or the like that blocks the cruise of a host vehicle by using the magnitude and direction of the optical flow vectors has been disclosed. The device described in Japanese Patent Application Publication No. 2005-157779 (JP-A-2005-157779) calculates a displacement of a movable body from a first image including a plane of motion on which the movable body moves, obtains optical flow from a second image that excludes the plane of motion and includes a target object, and calculates the distance to the target object on the basis of the displacement of the movable body and the optical flow.

In order to detect information of an object that blocks the movement of the movable body by using the optical flow, the displacement of the movable body itself is also necessary, as in the above-descried device. For obtaining the displacement of a movable body with high accuracy by image processing, a load of computational processing is high.

SUMMARY OF THE INVENTION

The invention provides an object detection device that can detect an object, which is to be detected, without using the displacement of the movable body.

The first aspect of the invention relates to an object detection device including: an imaging unit carried on a movable body; a first calculation unit that calculate an observed value of an image displacement among a plurality of images captured by the imaging unit at respective different timings; a first object detection unit that detects an object candidate and acquires information of the object candidate; a second calculation unit that calculates a theoretic value of the image displacement on the basis of the information of the object candidate; and a second object detection unit that compares the observed value of the image displacement and the theoretic value of the image displacement and determines whether the object candidate is an object on the basis of the comparison result.

In the above-described object detection device, the image displacement (for example, an optical flow) is calculated by the first calculation unit from a plurality of images captured at different timings. In this case, an observed value of the image displacement is calculated, for example, for each feature point, each pixel, and each small region on the image. Further, in the above-described object detection device, the first object detection unit detects an object candidate around the movable body and acquires the information (for example, a distance and a relative velocity) of the detected object candidate. Further, in the object detection device, the second calculation unit calculates a theoretic value of the image displacement on the basis of the information of the detected object candidate. For example, when a standing object is present around the movable body, the observed value of the image displacement of the standing object calculated from the image including the standing object is well coincident (identical or substantially identical) with the theoretic value of the image displacement in a position on the image that corresponds to the standing object. Accordingly, in the object detection device, the second object detection unit compares the observed value of the image displacement calculated by the first calculation unit and the theoretic value of the image displacement in the corresponding position on the image, determines whether the object candidate is an object on the basis of the comparison result, and detects the object which is to be detected (for example, the standing object). Thus, with the object detection device, by estimating the theoretic value of the image displacement and comparing the theoretic value of the image displacement with the observed value of the image displacement, it is possible to detect the object, which is to be detected, and acquire information relating to the object, without using the displacement of the movable body. As a result, the load of computational processing is reduced and detection accuracy is increased.

In the object detection device, the second calculation unit may calculate the theoretic value of the image displacement corresponding to the object candidate.

Where the object candidate is detected and the object information is acquired by the first object detection unit, the second calculation unit of the object detection device calculates the theoretic value of the image displacement with respect to the detected object candidate. Then, in the object detection device, the second detection unit compares the observed value of the image displacement with the theoretic value of the image displacement for the detected object candidate and detects the object, which is to be detected, on the basis of the comparison result. By estimating a theoretic value of the image displacement with respect to the object candidate detected by the first detection unit and comparing the theoretic value and the observed value of the image displacement, it is possible to determine whether the object candidate detected by the first object detection unit is an object, which is to be detected. Further, because the processing is conducted only with respect to the object candidate that has been detected by the first object detection unit; the load of computational processing is further reduced.

In the object detection device, the second object detection unit may calculate a difference value between the observed value of the image displacement and the theoretic value of the image displacement for each of a plurality of segments on the image and determines whether the object candidate is the object on the basis of a segment for which the difference value is equal to or less than a first threshold.

In the object detection device, the second object detection unit calculates a difference value between the observed value of the image displacement and the theoretic value of the image displacement for each segments (for example, for each feature point, each pixel, and each small region) on the image, determines whether this difference value is equal to or less than a first threshold, and determines whether the object candidate is the object on the basis of a segment for which the difference value is equal to or less than the first threshold. Where the first threshold is set to a threshold for determining whether the observed value of the image displacement and the theoretic value of the image displacement in the corresponding position on the image are identical or substantially identical, the object candidate having the segment can be determined to be the object, which is to be detected, when the difference value is equal to or less than the first threshold. Thus, in the object detection device, by comparing the difference value between the theoretic value of the image displacement and the observed value of the image displacement for each segment with the first threshold, it is possible to determine whether the object candidate is the object, which is to be detected, with high accuracy and in a simple manner.

Further, in the object detection device, the second object detection unit may calculate a difference value between the observed value of the image displacement and the theoretic value of the image displacement for each of a plurality of segments on the image, calculates an average value of the difference values of the plurality of segments, and determines whether the object candidate is the object on the basis of the difference value and the average value of the difference values.

In the object detection device, a difference value between the observed value of the image displacement and the theoretic value of the image displacement in the corresponding position on the image is calculated for each segment on the image by the second object detection unit. As described hereinabove, for the standing object, the observed value of the image displacement a is well coincident with the theoretic value of the image displacement in the corresponding position on the image and the difference value thereof is zero or a value close to zero. However, when a relative lateral velocity (the movable body is steered or the object, which is to be detected, crosses a road in front of the movable body) or a relative vertical velocity (for example, pitching fluctuations of the movable body) occurs between the movable body and the object, which is to be detected, such a relative velocity component is added to the observed value of the image displacement. Therefore, the difference value between the observed value of the image displacement and the theoretic value of the image displacement in the corresponding position on the image increases to an extent corresponding to the relative velocity component. Accordingly, in the object detection device, the second object detection unit detects the object, which is to be detected, by taking into account the average value (value corresponding to the relative velocity component) of difference values in addition to the difference value of each segment. Thus, in the object detection device, by taking into account the average value of difference values in addition to the difference value between the theoretic value of the image displacement and the observed value of the image displacement for each segment, it is possible to detect the object with good accuracy even when a relative lateral velocity or a relative vertical velocity occurs between the movable body and the object.

Further, in the object detection device, the second object detection unit may calculate difference values between the observed value of the image displacement and the theoretic value of the image displacement for each of a plurality of segments on the image and determines whether the object candidate is the object on the basis of a degree of change, with respect to change of positions on the image, of the difference values for each of the plurality of segments.

For the standing object, the difference value between the observed value of the image displacement and the theoretic value of the image displacement in the corresponding position on the image is zero or a value close to zero. Therefore, the difference value for each feature point in the region where the standing object is present does not change depending on the position on the image. However, where the object is not a standing object, the observed value of the image displacement changes depending on the distance from the movable body and the difference value between the observed value of the image displacement and the theoretic value of the image displacement in the corresponding position on the image also changes. Therefore, the difference value for each segment changes depending on the position on the image. Accordingly, the second object detection unit calculates a difference value between the observed value of the image displacement and the theoretic value of the image displacement for each of a plurality of segments on the image and detects the object, which is to be detected, on the basis of the degree of change, with respect to change of a position on the image, of the difference value of each feature point. In the object detection device, by determining whether the object candidate is an object, which is to be detected, on the basis of the degree of change, with respect to change of a position on the image, of the difference value between the observed value of the image displacement and the theoretic value of the image displacement for each segment, it is possible to detect the object, which is to be detected, with higher accuracy.

The object detection device may further include a turning state detection unit that detects a turning state of the movable body, and a correction unit that corrects the theoretic value of the image displacement on the basis of the turning state, wherein the second detection unit may compare, for each of a plurality of segments on the image, the observed value of the image displacement with a corrected theoretic value of the image displacement, which has been corrected by the correction unit, and determines whether the object candidate is the object on the basis of the comparison result.

When a movable body turns, a relative lateral velocity occurs between the movable body and the object, which is to be detected. As a result, this relative lateral velocity is added to the observed value of the image displacement. Therefore, the difference value between the observed value of the image displacement and the theoretic value of the image displacement in the corresponding position on the image increases to an extent corresponding to the relative lateral velocity. Accordingly, in the object detection device, the turning state detection unit detects a turning state of the movable body, and the correction unit corrects the theoretic value of the image displacement on the basis of the turning state of the movable body. Then, in the object detection device, the second detection unit compares the observed value of the image displacement with the corrected theoretic value of the image displacement, which has been corrected by the correction unit, for each segment on the image and detects the object, which is to be detected, on the basis of the comparison result. In the object detection device, by correcting the theoretic value of the image displacement on the basis of the turning state of the movable body, it is possible to detect the object, which is to be detected, with higher accuracy.

BRIEF DESCRIPTION OF THE DRAWINGS

The features advantages, and technical and industrial significance of this invention will be described in the following detailed description of example embodiments with reference to the accompanying drawings, in which like numerals denote like elements, and wherein:

FIG. 12 illustrates an example of observed values and corrected theoretic values of lateral components of optical flow of feature points in each lateral position in a case in which a standing object (a pedestrian) is present when the vehicle is steered;

FIG. 14 is a flowchart illustrating a flow of processing in the ECU of the fourth embodiment.

DETAILED DESCRIPTION OF EMBODIMENTS

Figure 1:
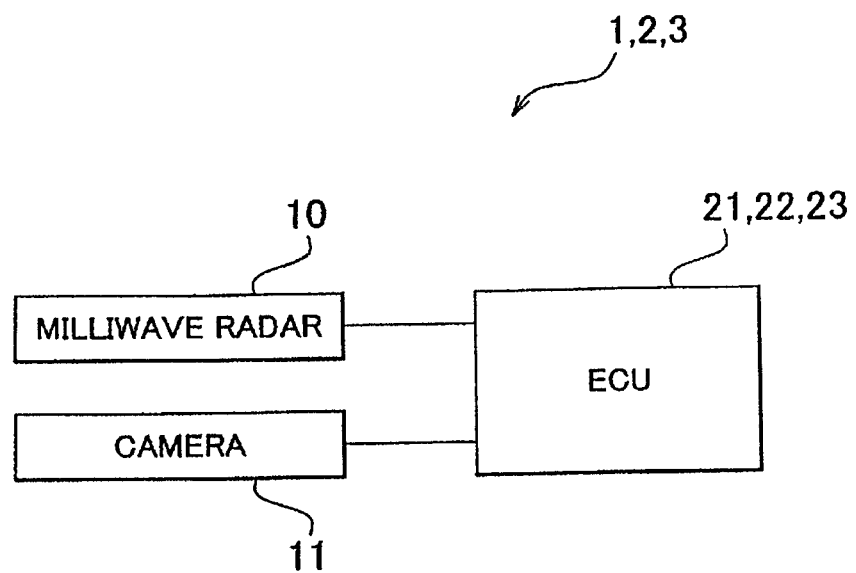
FIG. 1 is a structural diagram of the surroundings monitoring apparatus according to the first to third embodiments.

Embodiments of the object detection device according to the invention will be explained below with reference to the appended drawings. In the drawings, same or corresponding elements are assigned with same reference characters and redundant explanation thereof is omitted.

In the embodiments, the object detection device according to the invention is applied to a surroundings monitoring apparatus carried on a vehicle. The surroundings monitoring apparatus of the present embodiments detects a standing object located in front of the vehicle. Further, the surrounding monitoring device outputs information on the detected standing object to a driving assistance device (a collision preventing device and the like) or provides the same to a driver by sound or display. The standing object as referred to herein is an object that may block the cruise of the vehicle and indicates a moving object such as another vehicle, a bicycle, and a pedestrian, or a static object such as a fallen object. The first embodiment is a basic example in which a standing object is detected on the basis of a difference value between an observed value and a theoretic value of an optical flow. The second embodiment is an example in which the difference value is corrected by taking into account a relative velocity component of the target with respect to the vehicle in the lateral direction of the vehicle or vertical direction of the vehicle. The third embodiment is an example in which a standing object is detected based on a result obtained by fitting a line to difference values between the observed values and theoretic values of optical flows. The fourth embodiment is an example in which the theoretic value is corrected based on a turning state during steering of the vehicle. In the present embodiments, the standing object located in front of the vehicle is assumed to be detected, but the device may be also configured to detect a standing object located on the side or behind the vehicle.

Figure 2:
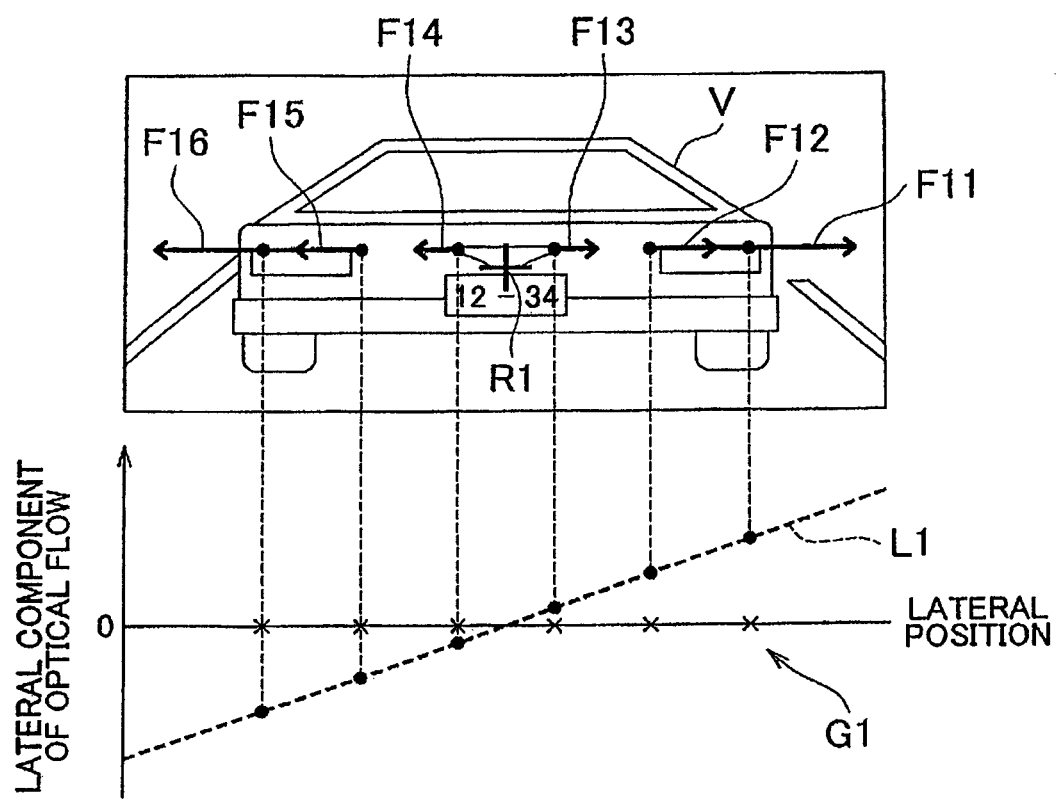
FIG. 2 illustrates an example of observed values and theoretic values of lateral components of optical flow of feature points in each lateral position in a case in which a standing object (another vehicle) is present.
Figure 3:
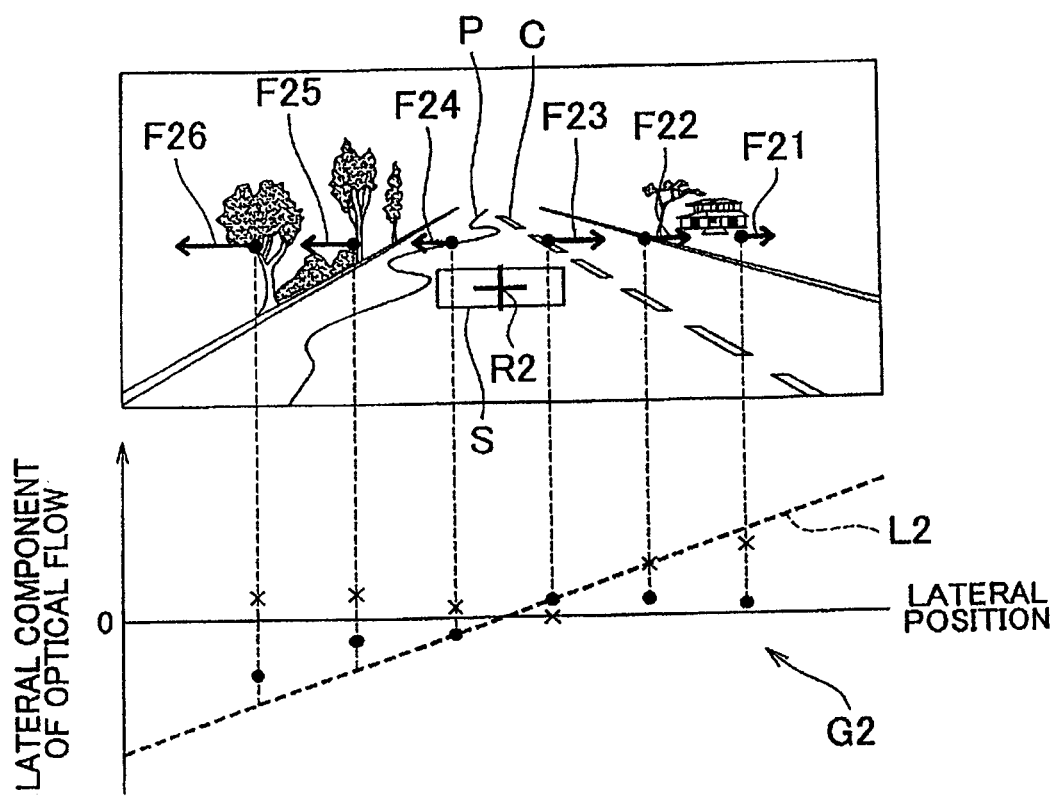
FIG. 3 illustrates an example of observed values and theoretic values of lateral components of optical flows of feature points in each lateral position in a case in which a standing object is absent.

A surroundings monitoring apparatus 1 according to the first embodiment will be explained with reference to FIGS. 1 to 3. FIG. 1 is a structural diagram of the surroundings monitoring apparatus according to the first to third embodiments. FIG. 2 illustrates an example of observed values and theoretic values of lateral components of optical flows of feature points in each lateral position in a case in which a standing object (another vehicle) is present. FIG. 3 illustrates an example of observed values and theoretic values of lateral component of optical flows of feature points in each lateral position in a case in which a standing object is absent.

The surroundings monitoring apparatus 1 detects information on a standing object on the basis of optical flows calculated from images of two frames that are consecutive in time. In particular, in the surroundings monitoring apparatus 1, a object candidate (a target) is detected on the basis of radar information, theoretic values of optical flows are estimated on the basis of relative information of the object candidate with respect to the vehicle, and whether the object is a standing object is determined on the basis of difference values between the theoretic value of optical flows and the observed values optical flows that have been calculated from the images. The surroundings monitoring apparatus 1 is provided with a milliwave radar 10, a camera 11, and an ECU 21.

In the first embodiment, the milliwave radar 10 and the ECU 21 function as a first object detection unit, the camera 11 functions as an imaging unit, and the ECU 21 functions as a first calculation unit, a second calculation unit, and a second object detection unit.

The milliwave radar 10 is a scan-type radar that detects an object by using electromagnetic waves in a milliwave band. The milliwave radar 10 is mounted on the central portion of the front end of the vehicle. Further, the milliwave radar 10 is mounted substantially parallel to the road surface in a position at a height sufficiently enabling the detection of the object to be detected. In the milliwave radar 10, milliwaves are emitted in predetermined intervals towards a zone in front of the vehicle, while being scanned in the horizontal direction within a predetermined angle range, and the reflected milliwaves (milliwaves reflected off the targets) are received. Further, in the milliwave radar 10, radar signals composed of data (scanning azimuth in the horizontal direction, emission timing, reception timing, reflection intensity, etc.) relating to each reflection point (detection point) are transmitted in predetermined intervals to the ECU 21.

The camera 11 is a monocular camera configured to capture images in front of the vehicle. The camera 11 is mounted on a predetermined location in the center of the front part of the vehicle. The camera 11 captures images in front of the vehicle in predetermined intervals and transmits the captured image information as image signals to the ECU 21. The captured images are images of frames in predetermined intervals (for example, 100 msec).

The ECU 21 is an electronic control unit composed of a Central Processing Unit (CPU), Read Only Memory (ROM), and Random Access Memory (RAM) and serving to conduct overall control of the surroundings monitoring apparatus 1. In the ECU 21, radar signals from the milliwave radar 10 and image signals from the camera 11 are fetched in predetermined intervals and radar information and captured image information is stored in a time sequence. Further, in the ECU 21, processing for detecting the standing object is conducted using such information, and the information on the detected standing object (for example, distance, relative velocity, lateral position, and movement direction) is outputted to the driving assistance apparatus or provided to the driver.

In the ECU 21, a large number of reflection points contained in the radar information are grouped based on predetermined conditions. This grouping may be conducted using a conventional method. In the ECU 21, a distance Z to a target is calculated on the basis of time from emission to reception of milliwaves for each group (target) obtained by grouping. Further, in the ECU 21, a relative velocity V, with respect to the target is calculated on the basis of time variation of the distance Z. Further, in the ECU 21, a relative direction of the target with respect to the vehicle and a lateral position, which is a position in the lateral direction of the vehicle, are calculated on the basis of a scanning azimuth of the milliwaves in the horizontal direction. In this case, one information (for example, one relative direction or one lateral position) is calculated for each of the groups by using and fusing data on a plurality of reflection points in the respective groups.

In the ECU 21, a search window in the captured image is set for each target in accordance with the position of the target. The search window may be of a predetermined size or may be of a size in accordance with radar information when the information relating to the size of the target (lateral width and the like) has been detected with the radar. Further, in the ECU 21, feature points are extracted from inside the search window of the captured image. An edge is an example of a feature point, and the extraction can be made using a sobel filter or the like.

In the ECU 21, an optical flow of a small region on the perimeter of a feature point on the captured image is calculated using a captured image of a frame at the present timing (t) and a captured image of a frame at a preceding timing (t−1) for each feature point detected in the search window. The optical flow may be calculated using a conventional method.

In the ECU 21, a theoretic value F of the optical flow in a position of the feature point on the captured image is calculated using a relative information (distance, relative velocity) of the target by Equation (1). This calculation of the theoretic value of optical flow is conducted under an assumption that all of the points in the image are locate at a distance detected on the basis of radar information in an actual space (in other words, under an assumption that the standing object is present at a distance detected based on radar information).

$$F \cong (x - x_0 + f \times \tan\theta) \times \frac{Z_{t-1} - Z_t}{Z_t} \quad \text{Equation (1)}$$

In Equation (1), x is a coordinate (pixel unit) of a feature point in the lateral direction (vehicle lateral direction) on the image, and $x_0$ is a central coordinate in the lateral direction on the image. Further, f in Equation (1) is the number of a pixel corresponding to the focal distance of the camera 11. In Equation (1), θ is a mounting angle of the camera 11 with respect to the vehicle. When the central axis of the vehicle that extends forward of the vehicle coincides with the direction of the optical axis of the camera 11 coincide, the mounting angle is zero. Further, $Z_{t-1}$ in Equation (1) is a distance between the target and the vehicle at a capturing timing of the frame at the previous timing (t−1), and $Z_t$ is a distance between the target and the vehicle at a capturing timing of the frame at the present timing (t). The difference between distances ($Z_{t-1}-Z_t$) is obtained by multiplying the relative velocity $V_r$ of the target and the vehicle that has been calculated on the basis of radar information by a capturing time interval Δt of camera 11. In Equation (1), the relative velocity is assumed to be constant, but it may be also obtained by taking into account a relative acceleration. When the detection time interval in the milliwave radar 10 and the capturing time interval in the camera 11 are the same, the distance Z between the target and the vehicle that has been calculated on the basis of radar information may be used without changing. Here, (f×tan θ) is a correction value to correct the central coordinate in the lateral direction on the image in a case in which the direction of the optical axis of the camera 11 shifts with respect to the direction of the central axis of the vehicle that extends forward of the vehicle. Therefore, when the camera 11 is mounted such that the direction of the optical axis of the camera 11 coincides with the direction of central axis of the vehicle that extends forward of the vehicle, The correction value is not required (becomes zero) in Equation (1).

As described above, the theoretic values of optical flow is calculated under an assumption that a standing object is present. Therefore, when a standing object is actually present, the observed value of optical flow that has been calculated from the captured image is equal or substantially equal to the theoretic value of the optical flow. Therefore, when the difference value between the observed value of optical flow and the theoretic value of optical flow is zero or substantially zero, the target can be identified as the standing object. Where the difference value between the observed value of optical flow and the theoretic value of optical flow is not zero, the target can be identified as not being the standing object.

In the ECU 21, the difference value between the observed value of optical flow that has been calculated from the captured image and the theoretic value of optical flow is calculated for each feature point in the search window. Further, the ECU 21 determines whether the difference value is equal to or less than a threshold for each feature point in the search window. This threshold serves to determine whether the observed value of optical flow and the theoretic value of the optical value are the same value or a substantially the same value (to determine whether the difference value between the observed value of optical flow and the theoretic value of optical flow is zero or substantially zero). The threshold is set in advance with consideration for the detection error of the milliwave radar 10 and performance of the camera 11. A subtracted value obtained by subtracting the theoretic value of the optical flow from the observed value of the optical flow (or subtracting the observed value of the optical flow from the theoretic value of the optical flow) may be positive or negative. Therefore, the threshold has a positive upper limit value and a negative lower limit value. Whether the difference value (that is, an absolute value of the subtracted value) is equal to or less than the threshold is determined by whether the subtracted value falls within a range from the negative lower limit value to the positive upper limit value. Another option is to determine whether an absolute value of the subtracted value is equal to or less than the positive upper limit threshold.

The ECU 21 determines whether or not the ratio of feature points for which the difference value is equal to or less than the threshold in the group of feature points in the search window is large (for example, the ratio is 80% or greater, or 90% or greater). More specifically, the ECU 21 determines whether or not the ratio of feature points for which the difference value is equal to or less than the threshold is equal to or greater than a predetermined ratio (for example, 80% or 90%). Where the ratio of feature points for which the difference value is equal to or less than the threshold is large (equal to or greater than the predetermined ratio), the ECU 21 determines the target as a standing object and sets the information on the standing object (distance, relative velocity, lateral position, and the like) on the basis of relative information detected from the radar information relating to this target or based on the optical flow of each feature point. Where the ratio of feature points for which the difference value is equal to or less than the threshold is small (less than the predetermined ratio), the ECU 21 determines that the target is not a standing object. The size of the standing object detected from the image and also a type of the standing object detected by using pattern recognition or the like may be added to the information on the standing object.

Once the processing is completed for all of the targets, the ECU 21 outputs the information on all of the detected standing objects to the driving assistance device or the driver.

FIG. 2 illustrates an example relating to a case in which another vehicle V (standing object) is present in front of the vehicle. A detection position R1 of the target detected from the radar information obtained with the milliwave radar 10 is shown on the rear surface of the other vehicle V. Further, optical flows F11 to F16 in feature points calculated from the captured image are also shown on the rear surface of the other vehicle V. In the graph G1, a lateral position on the image is plotted along the abscissa, and the lateral component of the optical flow is plotted along the ordinate. In the graph G1, the observed values of the lateral components of optical flows F11 to F16 in each feature point are shown by black circles, the theoretic values of lateral components of optical flows against lateral positions are shown by a broken straight line L1, and the difference values between the observed values of lateral components of optical flows F11 to F16 in each feature point and the theoretic values of lateral components of optical flows in the lateral positions corresponding to the feature points are shown by cross-like symbols.

FIG. 3 illustrates an example in which no standing object is present in front of the vehicle. A detection position R2 of a target detected from the radar information obtained with the milliwave radar 10 is shown on a steel plate S located on the road. Optical flows F21 to F26 in feature points calculated from the captured image are shown on the center line C and pattern P on the road. In graph G2, black circles show observed values of lateral components of optical flows F21 to F26 in each feature point, a broken straight line L2 shows theoretic values of lateral components of optical flows against lateral positions, and cross-like symbols show difference values between the observed values of lateral components of optical flows F21 to F26 in each feature point and the theoretic values of lateral components of optical flows in the lateral positions corresponding to the feature points.

As shown in graph G1 in FIG. 2, when a standing object such as a vehicle V is present, the observed value of optical flow and the theoretic value of optical flow in the corresponding lateral position on the image are equal to each other and the difference value thereof is zero. As shown in graph G2 in FIG. 3, when no standing object is present on the road, the observed value of optical flow and the theoretic value of optical flow in the corresponding lateral position on the image differ from each other and the difference value thereof is not zero. Thus, whether the standing object is present can be determined by the difference value between the observed value and the theoretic value of the optical flow.

Figure 4:
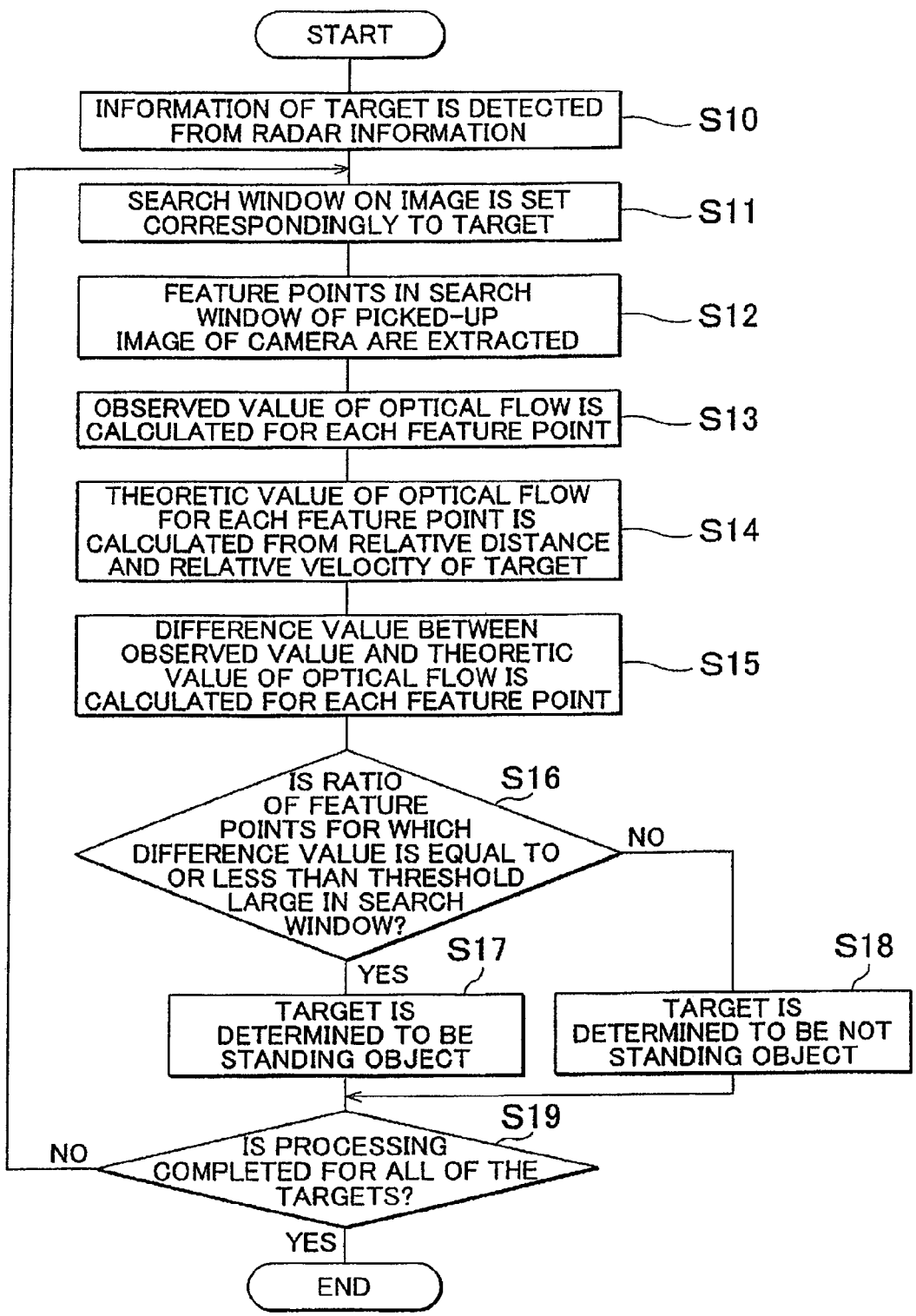
FIG. 4 is a flowchart illustrating a processing flow in an Electronic Control Unit (ECU) of the first embodiment.

The operation of the surroundings monitoring apparatus 1 will be explained below with reference to FIG. 1. In particular, the processing conducted in the ECU 21 will be explained with the flowchart shown in FIG. 4. FIG. 4 is a flowchart illustrating the flow of processing in the ECU according to the first embodiment.

In the milliwave radar 10, milliwaves are emitted, while being scanned in the horizontal direction, in the predetermined intervals. When the reflected waves are received, the received information relating to reflection points is transmitted as radar signals to the ECU 21. The ECU 21 receives the radar information and stores the received radar information. The camera 11 captures images in front of the vehicle and transmits image signals to the ECU 21. The ECU 21 receives the image signals and stores the image information.

At each specific instant of time (for example, every time a captured image is acquired from the camera 11), the ECU 21 detects a target on the basis of radar information and acquires relative information of the target (S10).

For each detected target, the ECU 21 sets a search window on the image correspondingly to the target (S11). Then, the ECU 21 extracts feature points from the search window of the captured image of the present frame (S12).

The ECU 21 further calculates an observed value of optical flow for each feature point in the search window by using the captured image of the present frame and the captured image of the previous frame (S13). The ECU 21 then calculates a theoretic value of optical flow for each feature point in the search window by using relative information (distance, relative velocity) of the target (S14). The ECU 21 then calculates a difference value between the observed value of the optical flow obtained from the captured image and the theoretic value of the optical flow estimated from the relative information of the target for each feature point in the search window (S15).

The ECU 21 then determines whether the difference value of each feature point in the search window is equal to or less than the threshold and determines whether the ratio of feature points for which the difference value is equal to or less than the threshold in the search window is large (S16). When the ratio of feature points for which the difference value is equal to or less than the threshold has been determined in S16 to be large, the ECU 21 determines that the target is a standing object and sets information of the standing object on the basis of the relative information of the target and the optical flows of each feature point (S17). Where the ratio of feature points for which the difference value is equal to or less than the threshold has been determined in S16 to be small, the ECU 21 determines that the target is not a standing object (S18).

The ECU 21 then determines whether the processing has been completed for all of the detected targets (S19). When the processing is determined in S19 not to be completed for all of the targets, the ECU 21 returns to the processing of S11 and conducts the processing with respect to the next target. When the processing is determined in S19 to be completed for all of the targets, the ECU 21 outputs the information relating to all of the detected standing objects to the driving assistance device or provides the information to the driver and ends the present processing.

With such a surroundings monitoring apparatus 1, by estimating the theoretic values of optical flows and comparing the theoretic values of optical flows with observed values of optical flows, it is possible to determine with high accuracy as to whether a target (object candidate) is a standing object (object) and detect with high accuracy, for example, an obstacle to the vehicle. In this case, optical flows are used, the displacement of the vehicle is not necessary to use, and the load of computational processing can be reduced.

Further, with the surroundings monitoring apparatus 1, the processing is conducted only with respect to the target detected on the basis of radar information of the milliwave radar 10. Therefore, standing object determination can be conducted with respect to the target detected by the milliwave laser 10 and the load of computational processing can be further reduced. Furthermore, with the surroundings monitoring apparatus 1, the standing object determination is conducted by a simple processing of calculating the difference value between the theoretic value of the optical flows and the observed value of the optical flows and comparing the difference value with a threshold. Therefore, the load of computational processing can be further reduced.

Figure 5:
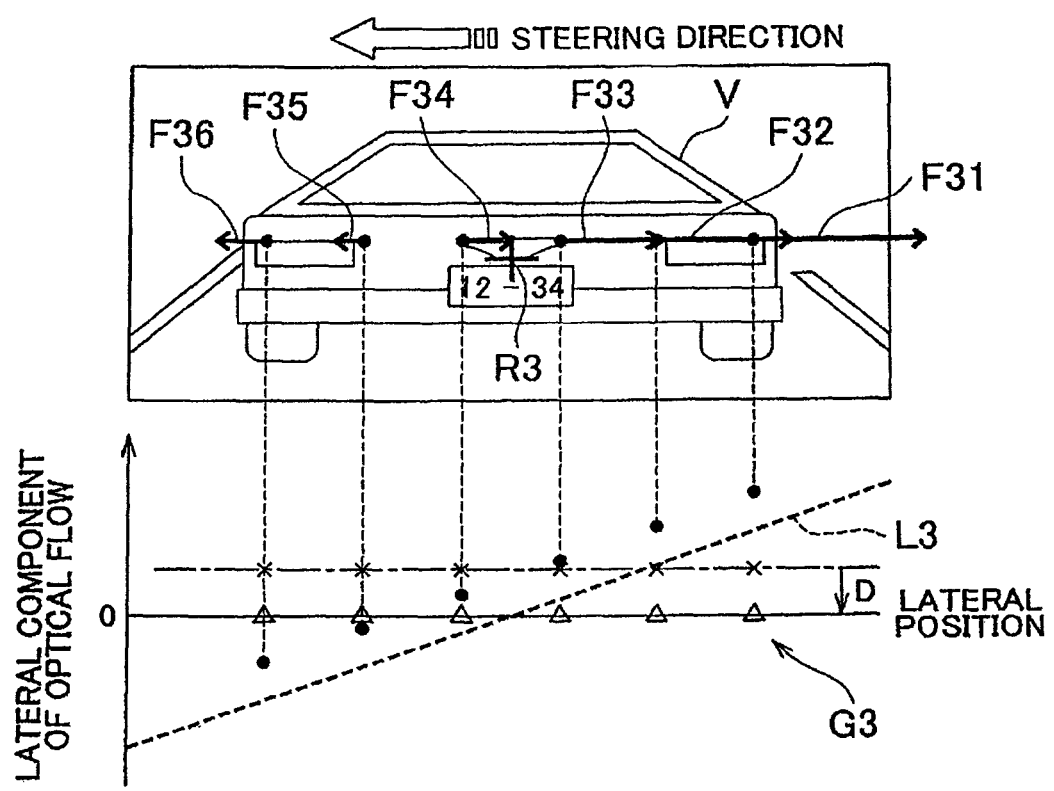
FIG. 5 illustrates an example of observed values and theoretic values of lateral components of optical flows of feature points in each lateral position in a case in which a standing object (another vehicle) is present when the vehicle is steered.

A surroundings monitoring apparatus 2 according to the second embodiment will be described below with reference to FIGS. 1 and 5. FIG. 5 shows an example of observed values and theoretic values of lateral components of optical flows of feature points in each lateral position in a case in which a standing object (another vehicle) is present when the vehicle is steered.

The surroundings monitoring apparatus 2 differs from the surroundings monitoring apparatus 1 according to the first embodiment in that the difference value is corrected by taking into account a relative velocity component of the target with respect to the vehicle. Accordingly, only this difference will be described below in detail. The surroundings monitoring apparatus 2 is provided with a milliwave radar 10, a camera 11, and an ECU 22.

In the second embodiment, the milliwave radar 10 and the ECU 22 function as a first object detection unit, the camera 11 functions as an imaging unit, and the ECU 22 functions as a first calculation unit, a second calculation unit, and a second object detection unit.

When a relative lateral velocity (for example, when the movable body is steered or when a pedestrian crosses a road in front of the vehicle) or a relative vertical velocity (for example, when the vehicle pitches) occurs between the vehicle and the target, the value corresponding to these relative velocity components (relative velocity components in the directions other than the front-rear direction) is added to the optical flow. In this case, such a relative velocity component is not reflected in the theoretic value of optical flow and the difference value between the observed value of optical flow and the theoretic value of optical flow increases (the difference value is not zero even when the object is a standing object), and whether the object is a standing object may not be accurately determined.

For example, a relative lateral velocity caused by steering of the vehicle or a relative vertical velocity caused by pitching fluctuations appear uniformly over the entire image. Therefore, the value to be added to the optical flow is the same for all of the feature points. Accordingly, the effect of the relative velocity component can be excluded from the observed value of optical flow by subtracting a value that cancels this value added to all of the feature points from the difference value. Further, the lateral velocity caused by the pedestrian crossing the road affects only part of the image. Therefore, the value added to the optical flow is the same for the feature points within the region where the pedestrian is present. Accordingly, the effect of the relative velocity component can be excluded from the observed value of optical flow by subtracting a value that cancels this value added to all of the feature points from the difference value.

The ECU 22 is an electronic control unit composed of a CPU, a ROM, a RAM, and the like, and conducts overall control of the surroundings monitoring apparatus 2. The ECU 22 differs from the ECU 21 of the first embodiment only in that a corrected difference value is obtained after calculating difference value for each feature point; and the comparison with a threshold is conducted by using the corrected difference value. Accordingly, this difference will be explained below in detail.

Where a difference value for each feature point is calculated for each search window (each target), the ECU 22 calculates the average value of difference values of all of the feature points in the search windows. When under the effect of a relative velocity component, a value corresponding to the relative velocity component is added to the optical flow of all of the feature points in the search window. Therefore, the average value of the difference values of all of the feature points in the search window is a value corresponding to the relative velocity component that has been added to the optical flow.

The ECU 22 subtracts the average value of difference values from the difference value for each feature point in the search window and obtains a corrected difference value. The ECU 22 then determines whether the corrected difference value is equal to or less than a threshold for each feature point in the search window.

The ECU 22 determines whether a ratio of feature points for which the corrected difference value is equal to or less than the threshold is large (equal to or greater than a predetermined ratio) in a group of feature points in the search window. When the ratio of feature points for which the corrected difference value is equal to or less than the threshold is large, the ECU 22 determines that the target is a standing object and sets information of a standing object for the target. Where the ratio of feature points for which the corrected difference value is equal to or less than the threshold is small, the ECU 22 determines that the target is not a standing object.

FIG. 5 illustrates an example in which another vehicle V (standing object) is present in the process of steering the vehicle to the left. A detection position R3 of the target that has been detected from radar information obtained with the milliwave radar 10 is shown on the rear surface of the other vehicle V. Optical flows F31 to F36 in feature points calculated from the captured images are shown on the rear surface of the other vehicle V, and a value corresponding to the lateral velocity caused by steering is added to the optical flows F31 to F36. In Graph G3, black circles denote observed values of lateral components of optical flows F31 to F36 in the feature points, a broken straight line L3 shows theoretic values of lateral components of optical flows against lateral positions, and cross-like symbols show difference values of the observed values of lateral components of optical flows F31 to F36 in the feature points and the theoretic values of lateral components of optical flows in lateral positions corresponding to the feature points.

As shown in graph G3 in FIG. 5, the observed values of the lateral components of optical flows of all of the feature points shown by black circles are displaced by a given value from the theoretic values of the lateral components of optical flows shown by a broken straight line L3, and the difference values of all of the feature points shown by cross-like symbols are correspondingly displaced from zero by the given value D. This given value D corresponds to the relative, lateral velocity caused by steering of the vehicle. Corrected difference values obtained by subtracting the given value D from the difference values of the feature points are also shown by triangular symbols and these corrected difference values are zero. Thus, even when the vehicle is steered, it is possible to distinguish whether the target is a standing object by correcting a difference value of each feature point with an average value of the difference values.

Figure 6:
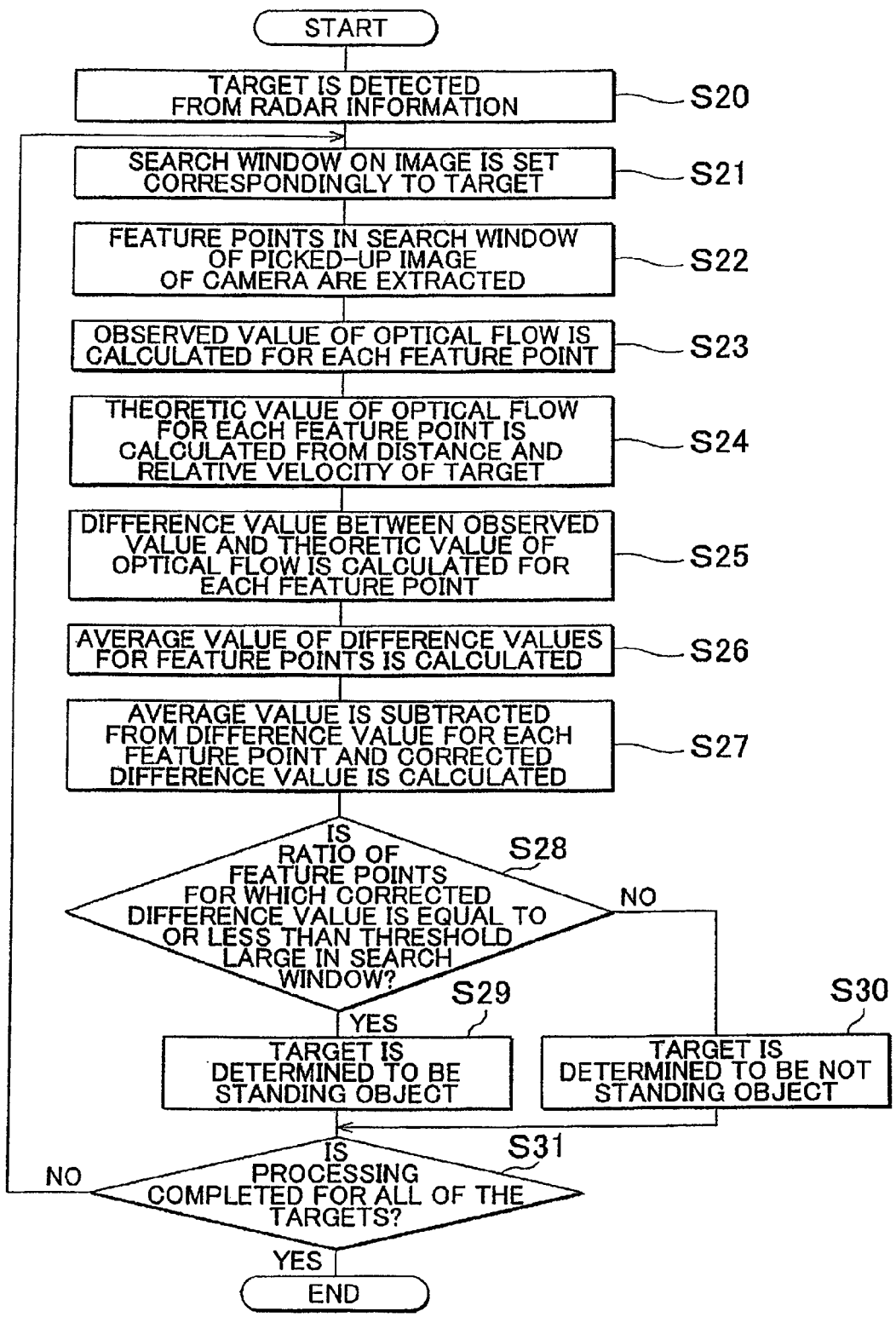
FIG. 6 is a flowchart illustrating a processing flow in the ECU of the second embodiment.

The operation of the surroundings monitoring apparatus 2 will be explained below with reference to FIG. 1. In particular, the processing in ECU 22 will be explained by following a flowchart shown in FIG. 6. FIG. 6 is a flowchart illustrating the flow of processing in the ECU of the second embodiment. In the processing performed in the surroundings monitoring apparatus 2, some of the operations performed in the ECU 22 are different from those performed in the surroundings monitoring apparatus 1 of the first embodiment, and only these operations will be explained in detail.

The processing of steps S20 to S25 in ECU 22 is similar to the processing of steps S10 to S15 in ECU 21 of the first embodiment.

Where the difference value of each feature point is calculated, an average value of the difference values of all of the feature points in a search window is calculated in the ECU 22 (S26). The ECU 22 then subtracts the average value from the difference value and obtains the corrected difference value for each feature point of the search window (S27).

The ECU 22 then determines whether the corrected difference value of each feature point in the search window is equal to or less than the threshold and determines whether a ratio of feature points for which the corrected difference value is equal to or less than the threshold in the search window is large (S28). When the ratio of feature points for which the corrected difference value is equal to or less than the threshold in the search window is determined in S28 to be large, the ECU 22 determines that the target is a standing object and sets information of the standing object (S29). When the ratio of feature points for which the corrected difference value is equal to or less than the threshold in the search window is determined in S28 to be small, the ECU 22 determines that the target is not a standing object (S30).

The ECU 22 then determines whether the processing has been completed for all of the detected targets (S31). When the processing is determined in S31 not to be completed for all of the targets, the ECU 22 returns to the processing of S21 and conducts the processing with respect to the next target. When the processing is determined in S31 to be completed for all of the targets, the ECU 22 outputs the information relating to all of the detected standing objects to the driving assist device or provides the information to the driver and ends the present processing.

The surroundings monitoring apparatus 2 demonstrates the following effect in addition to the effect similar to that of the surroundings monitoring apparatus 1 according to the first embodiment. With the surroundings monitoring apparatus 2, the difference value for each feature point is corrected on the basis of average value of the difference value between the theoretic value of optical flow and the observed value of optical flow of each feature point. As a result, it is possible to determine accurately as to whether the target is a standing object and, for example, to detect with higher accuracy an obstacle to the vehicle even when a relative lateral velocity or relative vertical velocity occurs between the host vehicle and the target.

Figure 7:
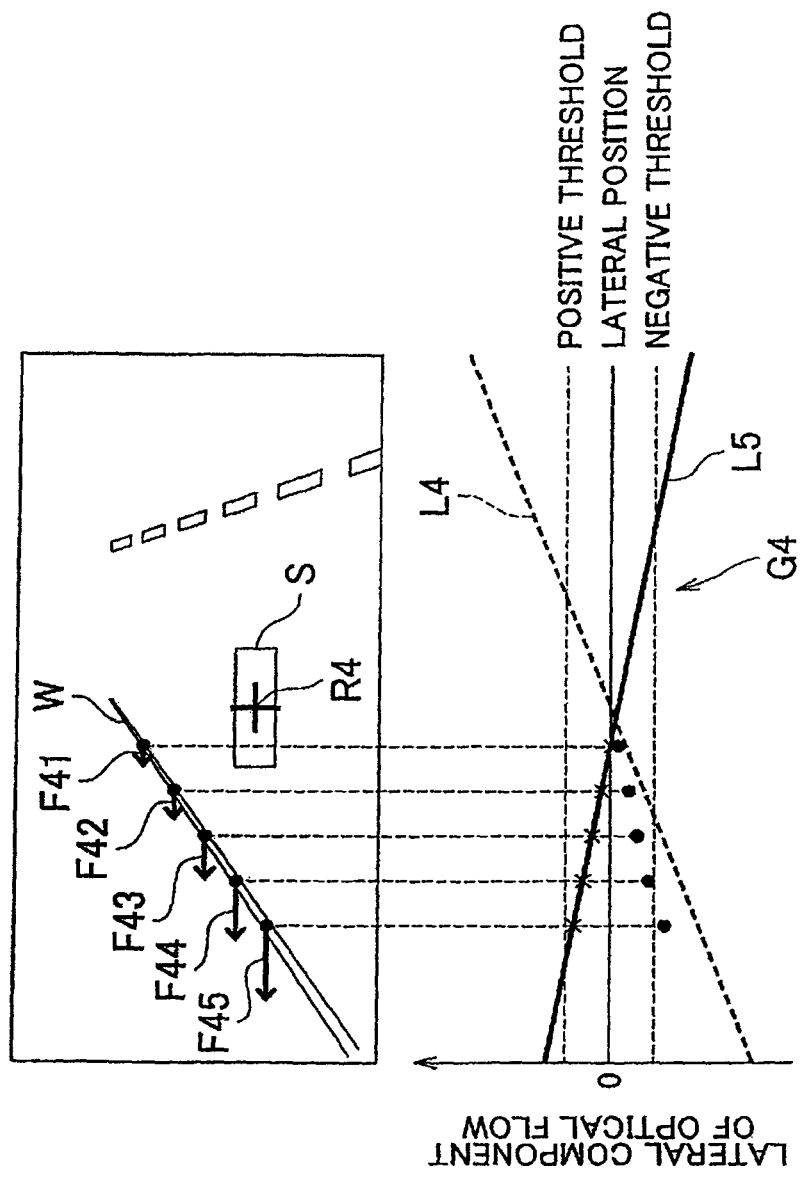
FIG. 7 illustrates an example of observed values and theoretic values of lateral components of optical flows of feature points corresponding to a white line in each lateral position in a case in which a standing object is absent.

A surroundings monitoring apparatus 3 according to the third embodiment will be explained below with reference to FIGS. 1 and 7. FIG. 7 shows an example of observed values and theoretic values of lateral components of optical flows of feature points corresponding to a white line (a lane marking) in each lateral position in the case in which a standing object is not present.

The surroundings monitoring apparatus 3 differs from the surroundings monitoring apparatus 1 according to the first embodiment in that whether a target is a standing object is determined on the basis of a straight line fitting to the difference values between the observed values and theoretic values of optical flows. Accordingly, only this feature will be described below in detail. The surroundings monitoring apparatus 3 is provided with a milliwave radar 10, a camera 11, and an ECU 23.

In the third embodiment, the milliwave radar 10 and the ECU 23 function as a first object detection unit, the camera 11 functions as an imaging unit, and the ECU 23 functions as a first calculation unit, a second calculation unit, and a second object detection unit.

The distance resolution of an optical flow is lower than the distance resolution of object detection using a stereo image or the like. Therefore, the difference values of feature points distributed in the distance direction (depthwise direction of the image) that is extracted from a white line or the like are equal to or less than the threshold and the target of the feature points may be erroneously determined as a standing object.

FIG. 7 illustrates an example in which no standing object is present in front of the vehicle. A detection position R4 of a target detected from the radar information obtained with the milliwave radar 10 is shown on a steel plate S located on the road. Optical flows F41 to F45 in feature points calculated from the captured image are shown on the white line W at the left edge of the road. In graph G4, black circles show observed values of lateral components of optical flows F41 to F45 in each feature point, a broken straight line LA shows theoretic values of lateral components of optical flows against lateral positions, and cross-like symbols show difference values between the observed values of lateral components of optical flows F41 to F45 in each feature point and the theoretic values of lateral components of optical flows in the lateral positions corresponding to the feature points. The difference values of the feature points are equal to or less than the threshold. Therefore, the comparison results of the difference values and the threshold may suggest that the white line W is a standing object.

As shown in FIG. 7, when a target is not a standing object, the magnitude of optical flow decreases with the distance from the vehicle (in the depthwise direction of the image) decreases. Therefore, in a case of a group of feature points, such as a white line, that is not a standing object, the difference values of the group of feature points change to the same extent correspondingly to the lateral position on the image and are therefore fitted with a straight line having a predetermined slope. By contrast, in a case of a group of feature points that is a standing object such as a vehicle, the difference values of the group of feature points are zero at all times, oven when the lateral position on the image changes, and fitted with a straight line with a zero slope. Accordingly, whether a target is a standing object is determined by using the slope of the straight line.

The ECU 23 is an electronic control unit composed of a CPU, a ROM, a RAM, and the like, and conducts overall control of the surroundings monitoring apparatus 3. The ECU 23 differs from the ECU 21 of the first embodiment only in that the comparison with a threshold is conducted by using the slope of a straight line fitting to the difference values of feature points after the difference value for each feature point has been calculated. Accordingly, this feature will be explained below in detail.

Where a difference value of each feature point is calculated for each search window (each target), the ECU 23 finds a fitting straight line by using lateral positions on the image and the difference values for all of the feature points in the search window. This fitting straight line may be found by using a conventional method.

The ECU 23 determines whether the slope of the fitting straight line is equal to or less than a threshold. The threshold serves to determine whether the slope of the fitting line is 0 or substantially 0 (further, a threshold for determining whether the target is a standing object) and is set in advance with consideration for a detection error of the milliwave radar 10 and performance of the camera 11. The slope of the straight line may be positive or negative. Therefore, the threshold has a positive upper limit value and a negative lower limit value. Whether the slope of the straight line is equal to or less than the threshold is determined by whether the slope of the straight line falls within a range from the negative lower limit value to the positive upper limit value. Another option is to determine whether an absolute value of the slope of the straight line is equal to or less than the positive upper limit threshold. When the slope of the straight line is equal to or less than the threshold, the ECU 23 determines that the target is a standing object and sets information of the standing object. When the slope of the straight line is greater than the threshold, the ECU 23 determines that the target is not a standing object.

In the example shown in FIG. 7, a straight line L5 fits to the difference values of feature points shown by a cross-like symbols in graph G4. This straight line 15 has certain slope. Therefore, the white line W (target) is determined not to be a standing object.

Figure 8:
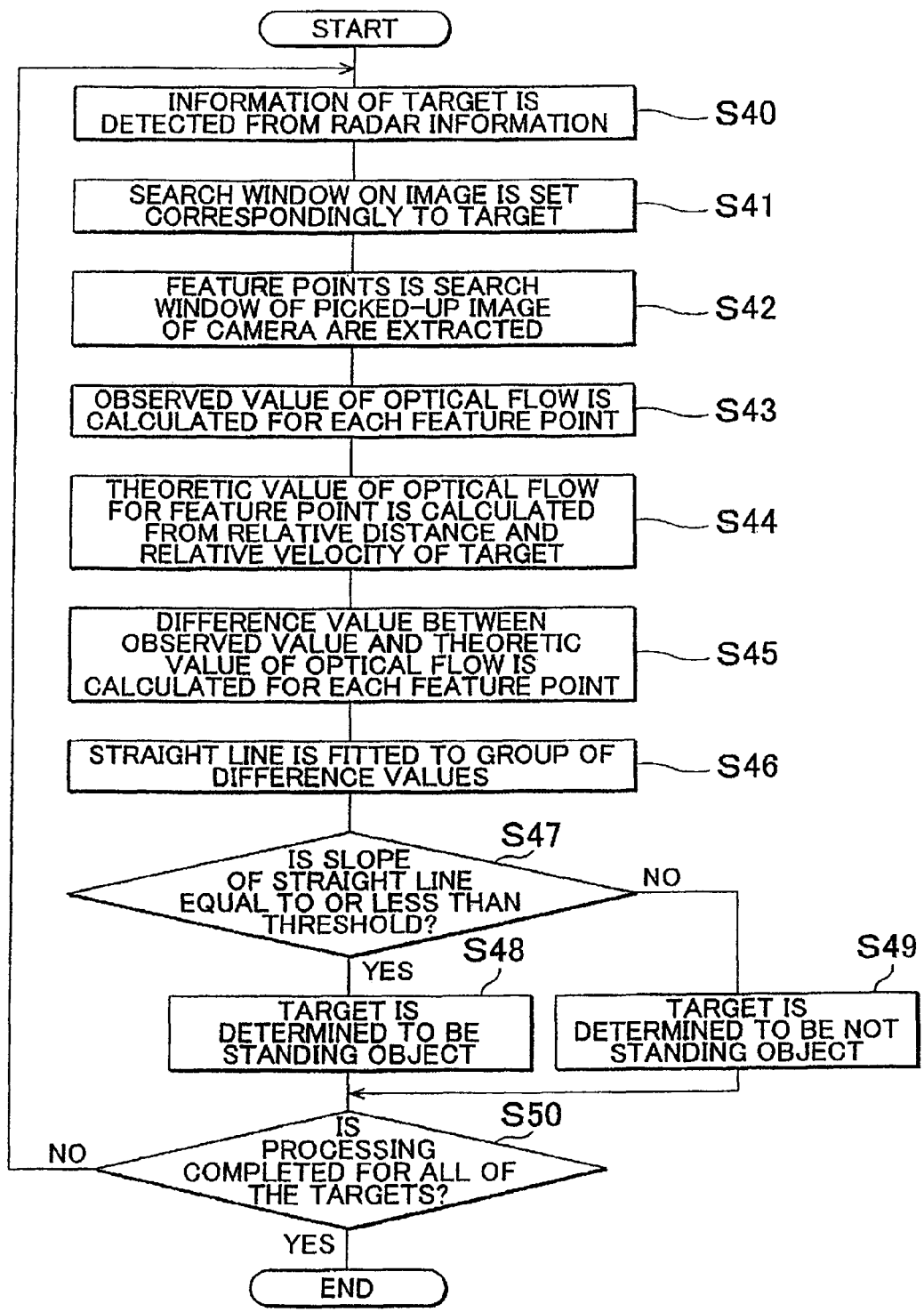
FIG. 8 is a flowchart illustrating a processing flow in the ECU of the third embodiment.

The operation of the surroundings monitoring apparatus 3 will be explained below with reference to FIG. 1. In particular, the processing in ECU 23 will be explained by following a flowchart shown in FIG. 8. FIG. 8 is a flowchart illustrating the flow of processing in the ECU of the third embodiment. In the processing performed in the surroundings monitoring apparatus 3, some of the operations performed in the ECU 23 are different from those performed in the surroundings monitoring apparatus 1 of the first embodiment, and only these operations will be explained in detail.

The processing of steps S40 to S45 in ECU 23 is similar to the processing of steps S10 to S15 in ECU 21 of the first embodiment.

Where the difference value of each feature point is calculated, the ECU 23 fits a straight line to a group of difference values of all of the feature points in a search window (S46).

The ECU 23 then determines whether the slope of the straight line is equal to or less than a threshold (S47). When the slope of the straight line is determined in S47 to be equal to or less than the threshold, the ECU 23 determines that the target is a standing object and sets information of the standing object (S48). When the slope of the straight line is determined in S47 to be greater than the threshold, the ECU 23 determines that the target is not a standing object (S49).

The ECU 23 then determines whether the processing has been completed for all of the detected targets (S50). When the processing is determined in S50 not to be completed for all of the targets, the ECU 23 returns to the processing of S41 and conducts the processing with respect to the next target. When the processing is determined in S50 to be completed for all of the targets, the ECU 23 outputs the information relating to all of the detected standing objects to the driving assistance device or provides the information to the driver and ends the present processing.

The surroundings monitoring apparatus 3 demonstrates the following effect in addition to the effect similar to that of the surroundings monitoring apparatus 1 according to the first embodiment. With the surroundings monitoring apparatus 3, by using a slope of a straight line fitting to the difference values between the theoretical values of optical flows and observed values of optical flows of all of the feature points, it is possible to determine whether the target is a standing object with good accuracy, for example, it is possible to detect with high accuracy an obstacle to the vehicle.

Figure 9:
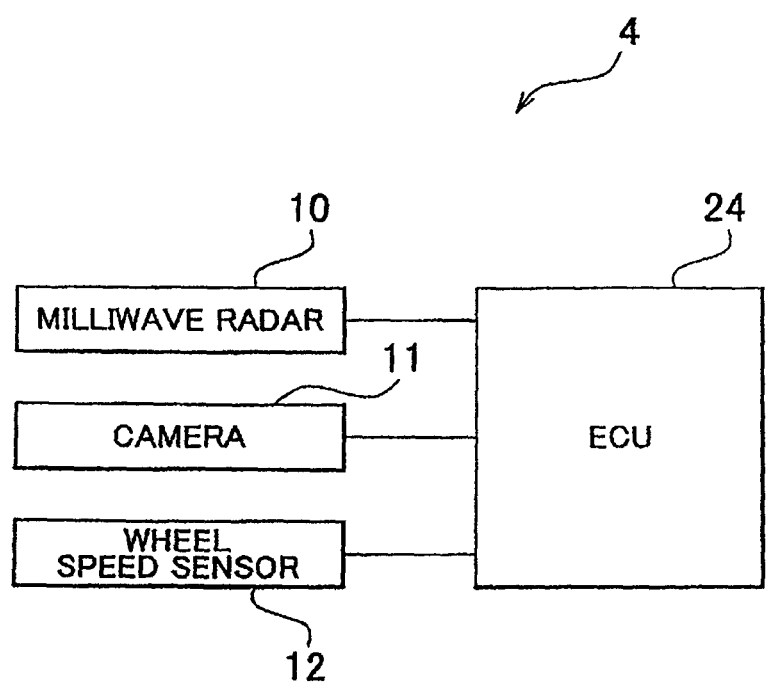
FIG. 9 is a structural diagram of the surroundings monitoring apparatus according to the fourth embodiment.
Figure 10:
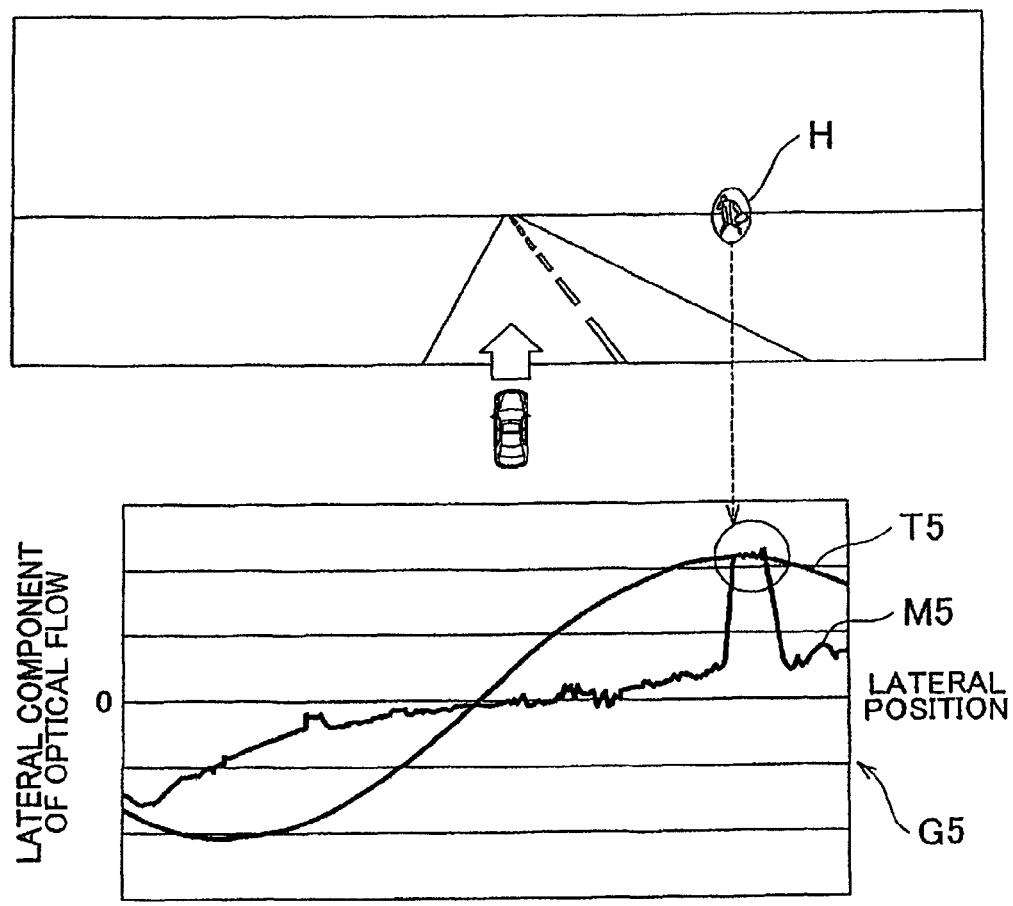
FIG. 10 illustrates an example of observed values and theoretic values of lateral components of optical flows of feature points in each lateral position in a case in which a standing object (a pedestrian) is present.
Figure 11:
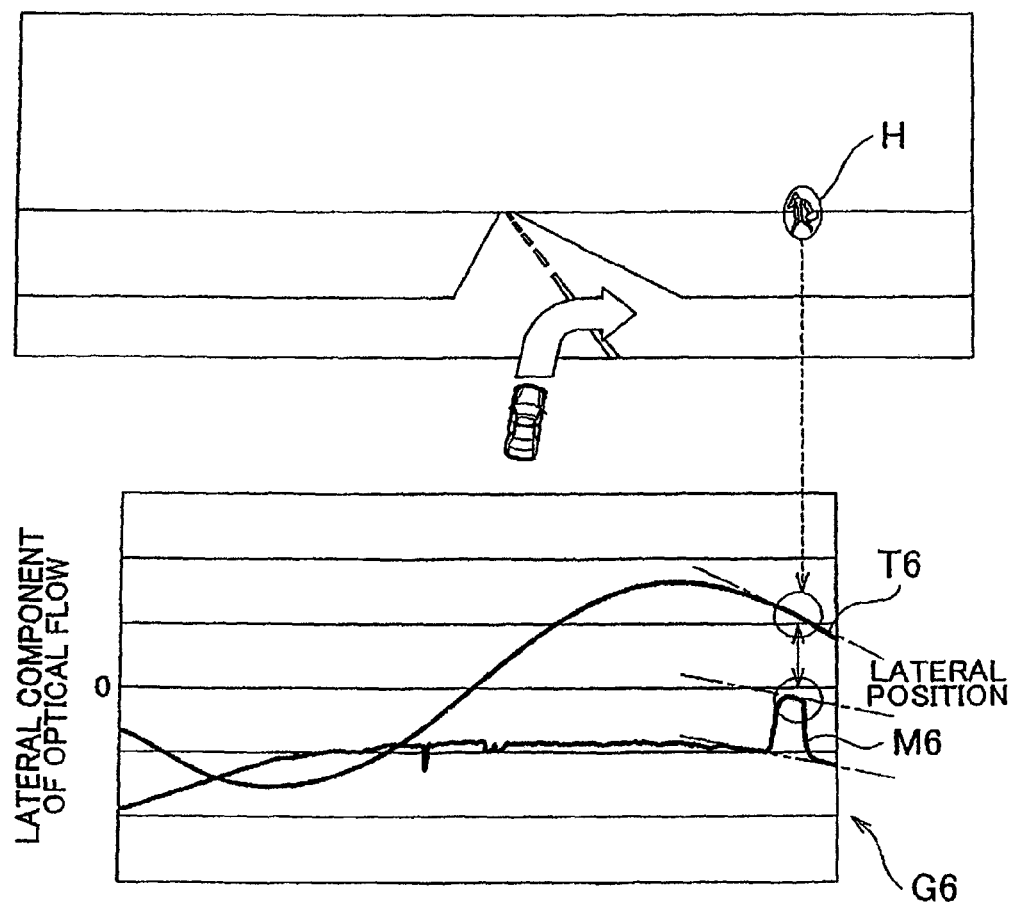
FIG. 11 illustrates an example of observed values and theoretic values of lateral components of optical flows of feature points in each lateral position in a case in which a standing object (a pedestrian) is present when the vehicle is steered.
Figure 13:
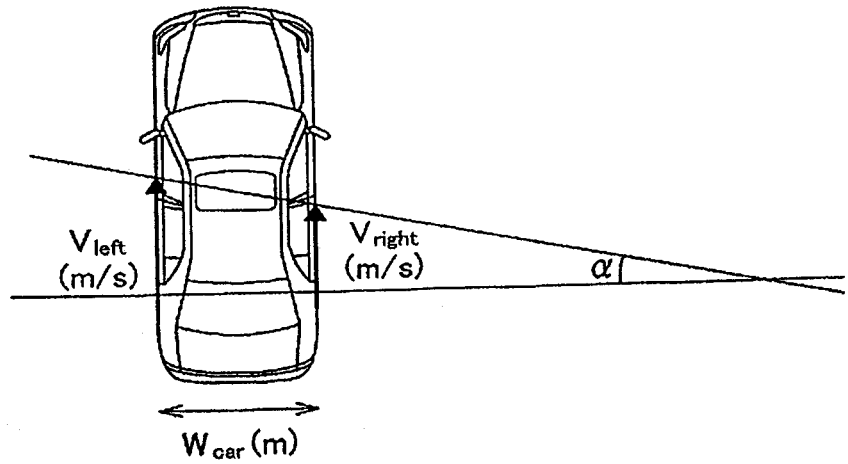
FIG. 13 is an explanatory drawing illustrating a method for calculating an offset value for correction from the speed of left and right wheels of the vehicle.

A surroundings monitoring apparatus 4 according to the fourth embodiment will be explained below with reference to FIGS. 9 to 13. FIG. 9 shows a structural diagram of the surroundings monitoring apparatus of the fourth embodiment. FIG. 10 is an example of observed values and theoretic values of lateral components of optical flows of feature points in each lateral position in a case in which a standing object (a pedestrian) is present. FIG. 11 is an example of observed values and theoretic values of lateral components of optical flows of feature points in each lateral position in a case in which a standing object (a pedestrian) is present when the vehicle is steered. FIG. 12 is an example of observed values and theoretic values of lateral components of optical flows of feature points in each lateral position in a case in which a standing object (a pedestrian) is present when the vehicle is steered. FIG. 13 is an explanatory drawing illustrating a method for calculating an offset value for correction from the speed of left and right wheels of the vehicle.

The surroundings monitoring apparatus 4 differs from the surroundings monitoring apparatus 1 according to the first embodiment in that the theoretic value is corrected on the basis of the turning states during steering of the vehicle. Accordingly, only this feature will be described below in detail. The surroundings monitoring apparatus 4 is provided with a milliwave radar 10, a camera 11, a wheel speed sensor 12, and an ECU 24.

In the fourth embodiment, the milliwave radar 10 and the ECU 24 function as a first object detection unit, the camera 11 functions as an imaging unit, a wheel speed sensor 12 and the ECU 24 function as a turning state detection unit, and the ECU 24 functions as a first calculation unit, a second calculation unit, a correction unit, and a second object detection unit.

As described above, when the vehicle is steered, a value corresponding to a relative lateral velocity of each target with respect to the vehicle and is added to the observed value of the optical flow. Because such a relative lateral velocity is not taken into account in the theoretic value of optical flow, the difference value between the observed value of optical flow and the theoretic value of optical flow increases and whether the target is a standing object may not be accurately determined. This effect of the relative lateral velocity becomes especially significant at a low vehicle speed. Accordingly, the theoretic values of optical flows of all of the feature points are corrected by an offset value corresponding to the turning state caused by the steering of the vehicle.

In the example illustrated by FIG. 10, a case is shown in which a pedestrian H is present on the right side in front of the vehicle as the vehicle travels straight forward. In graph G5, the observed values of lateral components of optical flows in each feature point are shown by a line M5 and the theoretic values of lateral component of optical flows in each lateral position are shown by a line T5. As shown in graph G5, when the vehicle travels straight forward, the observed values of lateral components of optical flows in each feature point relating to the pedestrian H and the theoretic values of lateral components of optical flows in lateral positions corresponding to the feature points are substantially equal to each other and the pedestrian H may be determined to be a standing object.

In the example illustrated by FIG. 11, a case is shown in which a pedestrian H is present on the right side in front of the vehicle as the vehicle is steered to the right at the intersection. In graph G6, the observed values of lateral components of optical flows in each feature point are shown by a line M6 and the theoretic values of lateral components of optical flows in each lateral position are shown by a line T6. As shown in graph G6, when the vehicle is steered, the observed values of lateral components of optical flows in each feature point relating to the pedestrian H and the theoretic values of lateral components of optical flows in lateral positions corresponding to the feature points differ from each other and the pedestrian H may be determined not to be a standing object. Further, as described in the third embodiment, if the slope of the straight line fitted to the observed values of the lateral components of optical flows of feature points relating to the pedestrian H coincides with the slope of the straight line fitted to the theoretic values of the lateral components of the corresponding optical flows, the pedestrian H may be determined to be a standing object. However, the slopes also do not coincide with each other. This is because the effect of distortions increases near edges of the image edges and therefore little difference appears between the slope of the straight line relating to the background component and the slope of the straight line relating to the pedestrian H.

Accordingly, as shown in graph G7 in FIG. 12, the theoretic values of lateral components of optical flows in the lateral positions shown by a line T6 are decreased as a whole to obtain corrected theoretic values shown by a line T7. As shown in graph G7, the observed values of lateral components of optical flows in feature points relating to the pedestrian H and the corrected theoretic values of lateral components of optical flows in the lateral positions corresponding to the feature points are substantially equal to each other even when the vehicle is steered and, therefore, the pedestrian H can be determined as a standing object.

The wheel speed sensor 12 is provided at each wheel and detects the rotation speed of the wheels. The wheel speed sensor 12 detects the rotation speed of the wheel and transmits the detected value as a wheel speed signal to the ECU 24.

The ECU 24 is an electronic control unit composed of a CPU, a ROM, a RAM, and the like and conducts overall control of the surroundings monitoring apparatus 4. The ECU 24 differs from the ECU 21 of the first embodiment only in that a wheel speed signal is inputted from the wheel speed sensor 12 of each wheel, an offset value is obtained on the basis of the left and right wheel speed, the theoretic value of optical flow of each feature point is corrected by the offset value, the comparison with the threshold is conducted by using the corrected theoretic values. Accordingly, this difference will be explained below in detail.

When a theoretic value of optical flow for each feature point is calculated for each search window, the ECU 24 calculates a wheel speed for each wheel from the rotation speed of the wheel detected by the wheel speed sensor 12 for each wheel. Then, the ECU 24 calculates a turning angle α of the vehicle by Equation (2) by using the left and right wheel speed. As shown in FIG. 13, $V_{right}$ in Equation (2) is a right wheel speed, $V_{left}$ is a left wheel speed, $W_{car}$ is a vehicle width, and $T_{flow}$ in Equation (2) is a time interval between the frames of consecutive images that is used to calculate the optical flow. The speed of front or rear wheels or an average value of the speed of front wheels and the speed of rear wheels may be used as the wheel speed on each side.

$$\alpha = \frac{180}{\pi} \times \arctan\left((V_{left} - V_{right}) \times \frac{T_{frow}}{W_{car}}\right) \qquad \text{Equation (2)}$$

The ECU 24 also calculates an offset value $F_{OFFSET}$ by using the turning angle α of the vehicle in Equation (3). $N_{pix/deg}$ in Equation (3) is the number of pixels per 1 deg of the angle on the image.

$$F_{OFFSET} = N_{pix/deg} \times \alpha \qquad \text{Equation (3)}$$

The ECU 24 then subtracts the offset value $F_{OFFSET}$ from the theoretic value of optical flow for each feature point in the search window and finds the corrected theoretic values. The ECU 24 then calculates a difference value between the observed value of optical flow calculated from the captured image and the corrected theoretic value of optical flow for each feature point in the search window. This difference value is then used to conduct the determination in the same manner as in the ECU 21 of the first embodiment.

The operation of the surroundings monitoring apparatus 4 will be explained below with reference to FIG. 9. In particular, the processing conducted in the ECU 24 will be explained with the flowchart shown in FIG. 14. FIG. 14 is a flowchart illustrating the flow of processing in the ECU according to the fourth embodiment. In the operation of the surroundings monitoring apparatus 4, only some operations in the ECU 24 that relate to the wheel speed sensor 12 differ from the operations conducted in the surroundings monitoring apparatus 1 of the first embodiment, and only these different operations will be explained hereinbelow in detail.

The wheel speed sensor 12 of each wheel detects the rotation speed of the wheel at each predetermined timing and sends the wheel speed signal to the ECU 24. The ECU 24 receives the wheel speed signals and stores the detected information.

The processing of steps S60 to S64 in the ECU 24 is similar to the processing of steps S10 to S14 in the ECU 21 according to the first embodiment.

When the theoretic value of optical flow for each feature point is calculated, the ECU 24 calculates the wheel speed on the basis of the detected information that has been detected by the wheel speed sensor 12 for each wheel (S65). Then, the ECU 24 calculates the offset value by using the left and right wheel speed (S66). The ECU 24 then corrects the theoretic value of optical flow by the offset value for each feature point in the search window (S66). The ECU 24 then calculates a difference value between the observed value of optical flow obtained from the captured image and the corrected theoretic value of optical flow for each feature point in the search window (S67).

The processing of steps S68 to S71 in the ECU 24 is similar to the processing of steps S16 to S19 in the ECU 21 according to the first embodiment.

The surroundings monitoring apparatus 4 demonstrates the following effect in addition to the effect similar to that of the surroundings monitoring apparatus 1 according to the first embodiment. With the surroundings monitoring apparatus 4, by correcting the theoretic value of optical flow on the basis of the turning state (turning angle) of the vehicle, it is possible to determine with good accuracy whether the target is a standing object even when the vehicle is steered and determine an object that is an obstacle to the vehicle with higher accuracy. This effect is especially significant when the vehicle travels at a low speed.

The embodiments of the invention are described above, but the invention is not limited to the above-described embodiments and can be implemented in a variety of forms.

For example, the embodiments relate to a surroundings monitoring apparatus that is carried on a vehicle and serves to detect a standing object on the perimeter of the vehicle, but the apparatus may be configured as one function in a driving assistance device or be carried on another movable body such as a robot.

Further, in the embodiments, a monocular camera is used as the imaging unit, but a stereo camera can be also used.

In the embodiments, a milliwave radar is used to detect an object on the vehicle surroundings and acquire relative information with the object, but another radar such as a laser radar may be also used or another means such as a stereo camera may be used.

In the embodiments, a configuration is used in which an observed value and a theoretic value of optical flow are compared for each feature point, but the comparison may be also conducted for predetermined region or each pixel.

In the fourth embodiment, a wheel speed sensor is used as means for detecting a turning state, but another detection means such as a yaw rate sensor may be also used.

The invention claimed is:

1. An object detection device comprising:
an imager carried on a movable body;
a first calculator that calculates an observed value of an image displacement among a plurality of images captured by the imager at respective different timings;
a first object detector that detects an object candidate and acquires information of the object candidate;
a second calculator that calculates a theoretic value of the image displacement on the basis of the information of the object candidate; and
a second object detector that compares the observed value of the image displacement and the theoretic value of the image displacement and determines whether the object candidate is an object on the basis of the comparison result,
wherein the second calculator calculates the theoretic value of the image displacement corresponding to the object candidate, and
the second calculator calculates the theoretic value of the image displacement of a point that is located at a distance equal to a distance between the object candidate and the movable body.

2. The object detection device according to claim 1, further comprising a controller, wherein the controller includes the first calculator, the second calculator, and the second object detector.

3. An object detection device comprising:
an imager carried on a movable body;
a first calculator that calculates an observed value of an image displacement among a plurality of images captured by the imager at respective different timings;
a first object detector that detects an object candidate and acquires information of the object candidate;
a second calculator that calculates a theoretic value of the image displacement on the basis of the information of the object candidate; and
a second object detector that compares the observed value of the image displacement and the theoretic value of the image displacement and determines whether the object candidate is an object on the basis of the comparison result,
wherein the second object detector calculates a difference value between the observed value of the image displacement and the theoretic value of the image displacement for each of a plurality of segments on the image and determines whether the object candidate is the object on the basis of a segment for which the difference value is equal to or less than a first threshold.

4. The object detection device according to claim 3, wherein
the second object detector determines that the object candidate is the object if a ratio of the segment for which the difference value is equal to or less than the first threshold is equal to or greater than a predetermined ratio.

5. The object detection device according to claim 3, wherein the segment corresponds to a feature point.

6. The object detection device according to claim 3, wherein the plurality of segments is included in a processing region that is set in accordance with a position of the object candidate.

7. The object detection device according to claim 3, further comprising a controller, wherein the controller includes the first calculator, the second calculator, and the second object detector.

* * * * *